H. McCONNELL.
APPARATUS FOR SEPARATING WATER FROM GAS.
APPLICATION FILED SEPT. 25, 1912.
1,055,203.
Patented Mar. 4, 1913.
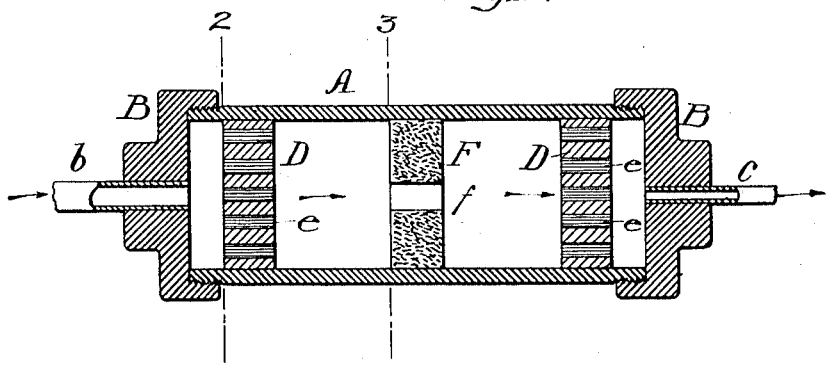
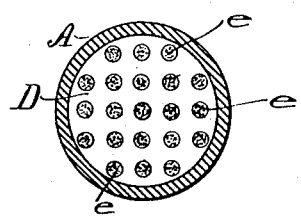
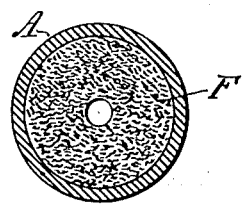
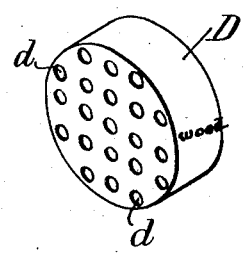
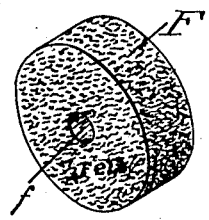
Witnesses:
Inventor
Harry McConnell
by his Attorneys

UNITED STATES PATENT OFFICE.

HARRY McCONNELL, OF WILMINGTON, DELAWARE, ASSIGNOR OF ONE-HALF TO SAMUEL J. NEWMAN, OF WILMINGTON, DELAWARE.

APPARATUS FOR SEPARATING WATER FROM GAS.

1,055,203.  Specification of Letters Patent.  Patented Mar. 4, 1913.

Application filed September 25, 1912. Serial No. 722,285.

*To all whom it may concern:*

Be it known that I, HARRY McCONNELL, a citizen of the United States, residing in Wilmington, county of Newcastle, State of Delaware, have invented certain Improvements in Apparatus for Separating Water from Gas, of which the following is a specification.

The object of my invention is to construct an apparatus adapted to be placed in an acetylene gas main, preferably near the generator, whereby the gas in its passage through the apparatus is freed to a great extent of moisture. Thus a much better and stronger light than heretofore is obtained and a good explosive mixture can be provided for use in gas engines.

In the accompanying drawing:—Figure 1, is a longitudinal sectional view of my improved device for removing excessive moisture from acetylene gas; Fig. 2, is a transverse sectional view on the line 2—2, Fig. 1; Fig. 3, is a transverse sectional view on the line 3—3, Fig. 1; Fig. 4, is a perspective view of one of the absorbing disks with the plugs removed; Fig. 5, is a perspective view of one of the plugs; and Fig. 6, is a perspective view of the felt baffle disk.

Referring to the drawing, A is a casing, screw threaded at each end in the present instance.

B, B' are caps secured to the casing, as shown.

*b* is the inlet tube for the acetylene gas and *c* is the outlet tube; the inlet tube being greater in diameter than the outlet tube.

D, D are two disks, one near each end of the casing A. These disks are preferably made of porous wood, such as chestnut, for instance, with the grain running longitudinally. Each disk has a number of holes *d* therein, as shown in Fig. 4, in which are plugs *e* of ratan or light fiber, which have longitudinal pores so that the gas is filtered as it passes through these disks.

F is a disk of felt, located midway between the disks D, D; there being a central hole *f* for the passage of the gas. The felt disk not only acts as an absorbent, but also as a baffle, so that the gas will be thoroughly mixed as it passes through the casing.

The gas is supplied to the casing under pressure through the inlet tube and forces its way through the porous disk *d* and into the central portion of the chamber, where it strikes the baffle disk F, which has a tendency to absorb the moisture, and then passing through an opening into a second chamber and through the porous disk D at the end of the chamber. These porous disks D, D take up a certain amount of moisture, as does the felt disk F. The gas passes out of the casing through a tube preferably less in diameter than the outlet tube, insuring a certain pressure in the casing and the proper mixing of the gas.

When the gas leaves the casing it is comparatively free of moisture and will produce a much better light than the same gas burned without using the device, and the explosive mixture produced is also more effective than gas which has not been relieved of the excessive moisture.

I claim:—

1. The combination of a casing; an inlet tube connected to one end of the casing and an outlet tube connected to the other end of the casing; a disk located in the casing; said disk having a series of longitudinal holes therein; and porous wood plugs located in the holes with the grain running longitudinally.

2. The combination in means for removing excessive moisture from gas, of a casing closed at each end; an inlet tube connected to one end of the casing; an outlet tube connected to the other end of the casing; two porous wooden disks located in the casing, each disk having a series of longitudinal holes therein; and plugs of ratan in the disks with the grain running longitudinally.

3. The combination in means for removing excessive moisture from acetylene gas, of a casing closed at each end; an inlet tube connected to one end of the casing; an outlet tube connected to the other end of the casing; two porous wooden disks, one located near each end of the casing with the grain running longitudinally and having longitudinal holes therein; with plugs of ratan mounted in the holes; and a centrally located felt disk having an opening therein for the passage of gas; the gas passing first through the porous disks, then through the opening in the felt disk, then through the other porous disk, and finally through the outlet pipe.

In testimony whereof, I have signed my name to this specification, in the presence of two subscribing witnesses.

HARRY McCONNELL.

Witnesses:
SAMUEL J. NEWMAN,
WM. A. BARR.